(12) United States Patent  
Gentric

(10) Patent No.: US 8,826,442 B2
(45) Date of Patent: Sep. 2, 2014

(54) MEDIA PLAYBACK DECODER TRACING

(75) Inventor: Philippe Gentric, Fourqueux (FR)

(73) Assignee: NXP B.V., Eindhoven (NL)

( * ) Notice: Subject to any disclaimer, the term of this patent is extended or adjusted under 35 U.S.C. 154(b) by 1059 days.

(21) Appl. No.: 12/374,585

(22) PCT Filed: Jul. 19, 2007

(86) PCT No.: PCT/IB2007/052887
§ 371 (c)(1),
(2), (4) Date: Jan. 21, 2009

(87) PCT Pub. No.: WO2008/012739
PCT Pub. Date: Jan. 31, 2008

(65) Prior Publication Data
US 2009/0288172 A1    Nov. 19, 2009

(30) Foreign Application Priority Data

Jul. 28, 2006 (EP) .................................. 06300838

(51) Int. Cl.
*G06F 7/04* (2006.01)
*G06F 21/10* (2013.01)

(52) U.S. Cl.
CPC ........ *G06F 21/10* (2013.01); *G06F 2221/2107* (2013.01); *Y10S 705/908* (2013.01)
USPC .................... 726/26; 705/51; 705/52; 705/57; 705/908; 382/181

(58) Field of Classification Search
USPC ............ 705/908, 51, 52, 57; 726/26; 382/181
See application file for complete search history.

(56) References Cited

U.S. PATENT DOCUMENTS

| 6,208,735 | B1 * | 3/2001 | Cox et al. ........................ 380/54 |
| 6,839,339 | B1 * | 1/2005 | Chuah ............................ 370/349 |
| 7,369,677 | B2 * | 5/2008 | Petrovic et al. ............... 382/100 |
| 7,426,750 | B2 * | 9/2008 | Cooper et al. .................. 726/26 |
| 7,434,056 | B2 * | 10/2008 | Belenko et al. ............... 713/176 |
| 2001/0051996 | A1 * | 12/2001 | Cooper et al. ................ 709/217 |
| 2002/0009151 | A1 * | 1/2002 | Gentric ..................... 375/240.26 |
| 2002/0023120 | A1 * | 2/2002 | Gentric .......................... 709/107 |
| 2002/0049976 | A1 * | 4/2002 | Gentric ........................... 725/61 |
| 2002/0090109 | A1 * | 7/2002 | Wendt ........................... 382/100 |

(Continued)

FOREIGN PATENT DOCUMENTS

EP    0853294 A    7/1998
EP    1351187 A    10/2003

(Continued)

OTHER PUBLICATIONS

Merriam Webster's Collegiate Disctionary, 1993, all pages.*

*Primary Examiner* — Calvin Cheung

(57) ABSTRACT

A method of identifying a traced media playback decoder embedded in a device, wherein data representative of a trace message is included in the content field of a media content file and a trigger string (16) is included in the user data field of the file. The file is input to the decoder, and a traced decoder is arranged and configured to render the trace message in a desired format in response to detection of the trigger string. If the decoder is not the traced decoder, the trigger string will be disregarded and the component will try and process the media content file like a normal media content file, which results in an error.

17 Claims, 3 Drawing Sheets

(56) References Cited

U.S. PATENT DOCUMENTS

| | | |
|---|---|---|
| 2002/0120634 A1 | 8/2002 | Min et al. |
| 2002/0146146 A1* | 10/2002 | Miolla et al. .................. 382/100 |
| 2002/0150247 A1* | 10/2002 | Linnartz et al. ............... 380/205 |
| 2002/0157005 A1* | 10/2002 | Brunk et al. .................. 713/176 |
| 2003/0105831 A1* | 6/2003 | O'Kane ........................ 709/217 |
| 2003/0131237 A1* | 7/2003 | Ameline et al. .............. 713/176 |
| 2003/0233547 A1 | 12/2003 | Gaston et al. |
| 2004/0028222 A1* | 2/2004 | Sewell et al. .................. 380/28 |
| 2004/0037449 A1* | 2/2004 | Davis et al. ................... 382/100 |
| 2005/0033965 A1 | 2/2005 | Iwamura |
| 2005/0050332 A1 | 3/2005 | Serret-Avila et al. |
| 2005/0058318 A1* | 3/2005 | Rhoads ........................ 382/100 |
| 2005/0114909 A1* | 5/2005 | Mercier ........................ 725/141 |
| 2005/0135476 A1* | 6/2005 | Gentric et al. ............. 375/240.1 |
| 2005/0137983 A1* | 6/2005 | Bells ............................... 705/51 |
| 2005/0276440 A1 | 12/2005 | Rhoads |
| 2006/0062426 A1* | 3/2006 | Levy et al. .................... 382/100 |
| 2006/0156377 A1* | 7/2006 | Gentric ........................ 725/138 |
| 2006/0277098 A1* | 12/2006 | Chung et al. ................... 705/14 |
| 2007/0241176 A1* | 10/2007 | Epstein et al. ................ 235/375 |
| 2008/0098017 A1* | 4/2008 | Joo et al. ...................... 707/101 |
| 2008/0281803 A1* | 11/2008 | Gentric ........................... 707/5 |
| 2009/0113536 A1* | 4/2009 | Zhang et al. .................... 726/12 |

FOREIGN PATENT DOCUMENTS

| | | | |
|---|---|---|---|
| JP | 11-239125 A | 8/1999 | |
| JP | 11-289255 A | 10/1999 | |
| JP | 2000-259139 A | 9/2000 | |
| JP | 2001-044952 A | 2/2001 | |
| JP | 2003-255970 A | 9/2003 | |
| WO | 9963443 A | 12/1999 | |
| WO | 0161508 A | 8/2001 | |
| WO | WO2007001285 A1 * | 1/2007 | ............ G06F 1/00 |

* cited by examiner

US 8,826,442 B2

MEDIA PLAYBACK DECODER TRACING

FIELD OF THE INVENTION

This invention relates generally to media playback decoder tracing, for use in tracing the presence of a proprietary media playback decoder, such as in the form of a software component embedded in a device.

BACKGROUND OF THE INVENTION

There are many circumstances in which it may be required for a software provider to determine whether or not a device, e.g. a mobile telephone, includes a proprietary software component. For this purpose, various methods of software tracing have been developed and implemented. In general, software tracing involves subjecting a device thought to contain traced software to a specified operation, hereinafter referred to as a trace trigger, such that a trace message (i.e. any unambiguous characterization of the presence of the traced software) will only be correctly issued if the traced software is present.

As a specific example, consider the case where the traced software component is a video decoder. For software tracing purposes, the traced software component may include a mechanism, whereby when a specific video stream is input for playback, a trace message is correctly displayed on a device only if the video decoder therein comprises the traced software. Otherwise, a different result, irrespective of what that is, will indicate that the video decoder does not comprise the traced software.

In another example, US Patent Application Publication No. 2003/0233547 describes a mechanism whereby when a software program is legally downloaded (under license) from a server and installed on a user's machine, the authorized user's machine is allocated a unique identification number and this identification number is embedded one or more times within the copy of the software program downloaded thereto. A Client Program is provided which, whenever the software program is to be executed, compares the identification number of the machine on which it is being run with the identification number embedded in the software program and will only permit execution of the software program if the two numbers match. Thus, if a further copy of the software program is illegally provided to another user's machine, it will not run thereon because the identification number embedded in the software program will not match the identification number assigned to the user's machine. Furthermore, the original user can be traced through the identification number embedded in the software program.

More generally, it is known to incorporate a trace message generator in the software component, wherein a trigger string is inserted into a compressed media content file and, when the media content file is played back by the software component, if the software component is not the traced software component, the trigger will be disregarded and the media content will be played back, whereas if the software component is the traced software component, the media decoder will recognize the trigger and cause a message generator to generate a specified trace message. However, the trace message file may be quite large, as will be the overhead due to the additional message generator, thereby increasing the overall overhead of the software component, which is not desirable.

Mechanisms of the above type are often referred to within the software industry as a "back door" and various back door mechanisms are known and commonly used to prevent unauthorized use of proprietary software.

Most media data formats are comprised of (at least) a user data field and a content field, wherein it is possible for data to be "hidden" in the user data field because conformant decoders/parsers are mandated to ignore data in this field. Thus, the user data field might, under some circumstances, be considered to be an appropriate part of a media data file in which to include a trace trigger. However, some specific difficulties are envisaged in implementing software tracing in this manner in media processing components such as video and audio decoders. One of the main difficulties is that such components do not have "direct" access to the device screen so as to enable a textual trace message to be displayed. Media processing components can only output the media format they are designed to produce, for example, a video decoder can only produce images (YUV frames), a music player can only output sound (PCM frames), etc. Thus, although a "trigger" could be provided in the user data field, it is not a simple matter to implement a sufficiently selective and specific trace message output.

SUMMARY OF THE INVENTION

It is therefore an object of the present invention to provide a method of identifying a traced media playback decoder, wherein an unambiguous trace message is consistently output in the correct format only if the decoder comprises the traced decoder, with a relatively low probability of accidental triggering, and without affecting the normal behavior or size of the decoder.

In accordance with the present invention, there is provided a decoder for decoding received media content, for playback in a predetermined media format, said media content having a data format comprising a user data field and a content field, wherein data representative of a trace message is included in said content field of the media content, said decoder further comprising means for rendering in said predetermined media format said trace message represented by said data included in said received media content. Also in accordance with the present invention, there is provided a method for identifying a traced media playback decoder, the decoder being arranged for decoding received media content for playback in a predetermined media format, the method comprising including in said traced decoder means for rendering in said predetermined media format a trace message from representative data included in received media content, inputting a media content file into a media playback decoder, said media content having a data format comprising a user data field and a content field and including in said data field data representative of a trace message, wherein said media playback decoder is identified as a traced media playback decoder only if said trace message is correctly rendered in said predetermined media format during playback of said media content file.

The present invention extends to a media content file for use in a method as defined above, said media content file having a data format comprising a user data field and a content field, wherein data representative of a trace message is included in said content field.

Thus, the above-mentioned object of the invention is achieved by including data representative of a trace message (which unambiguously characterizes the traced media playback decoder) in the content field of an input media content file so that, when the media content file is played back in the appropriate media format, the trace message will be output in the same media format if the playback decoder is, in fact, the traced media playback decoder.

In one exemplary embodiment of the present invention, the data representative of said trace message comprises a representation in said predetermined media format of the trace message, preferably partially or fully encrypted by a predetermined encryption mechanism, wherein in which case the decoder comprises means for decrypting and rendering in said predetermined media format said encrypted trace message included in said received media content. Said trace message may be encrypted using a product key unique to said traced decoder.

In another exemplary embodiment, the data representative of said trace message comprises a font file included in the content field of said media content, wherein said traced decoder includes a character generator for generating said trace message using said font file.

Beneficially, a trigger signal is included in the user data field of said content file, for causing said traced decoder to render in said predetermined media format said trace message from said representative data included in said received media content. The trigger signal may comprise a trigger string inserted in the user data field of the media content file.

The media content file may be compressed, either before or after encryption of said data representative of said trace message.

The decoder can take the form of a software component comprising software code which is executed by a processing device. It will be appreciated that the decoder can incorporate code to implement other playback functions, in addition to decoding. The software may be tangibly embodied on an electronic memory device, hard disk, optical disk or other machine-readable storage medium. The software may be delivered as a computer program product on a machine-readable carrier or it may be downloaded to a device via a network connection.

These and other aspects of the present invention will be apparent from, and elucidated with reference to, the embodiments described herein.

BRIEF DESCRIPTION OF THE DRAWINGS

Embodiments of the present invention will now be described by way of examples only and with reference to the accompanying drawings, in which.

DETAILED DESCRIPTION OF THE INVENTION

Thus, as explained above, the present invention is concerned with the provision of an encrypted trace message in the content field of a media content file, which is decrypted and rendered as a highly specific trace message output, in the required media format, during playback of the media content file only if the media playback software component is the respective traced software component.

Many different types of media playback applications are known, and the present invention is not necessarily intended to be limited in this regard. Obviously, the media format of the output trace message is dependent on the media format supported by the media playback software component to be traced.

Consider, for example, a video decoder/player. The typical output should be a YUV signal containing the trace message. It will be appreciated, however, that this signal does not need to be a true "video" signal, in the sense that it may comprise a single still image containing the trace message, wherein the still image is held on the display for some period of time. Alternatively, the trace message may be included in a scrolling display. In the case of an audio player, the typical output should be a PCM array containing the trace message.

Since the trace message is included in the media content, and not in the software component, the disadvantages caused by additional overhead and required use of the resources supporting the software component are avoided.

In the first instance, a trace message is generated in the desired format. Thus, in the case of a video decoder/player, a textual trace message in the form of a bitmap image can be generated by, for example, a character generator, whereas in the case of an audio player, the trace message may comprise a recorded verbal message. In both cases, the content of the trace message is likely to consist of the version number, product and proprietary company, but the present invention is not necessarily intended to be limited in this regard.

The type of encryption used to encrypt the trace message can be relatively primitive, since the single purpose thereof is to cause products that do not contain the traced software to be incapable of processing the media file. For example, XOR-ING the trace message with an arbitrary bit stream (e.g. a symmetric key) which can be quite short, i.e. of a length most efficiently processed by the platform. The key could be uniquely mapped to the product and version number of the traced software component, to avoid false detection of a traced software component in a product.

Figure 1:
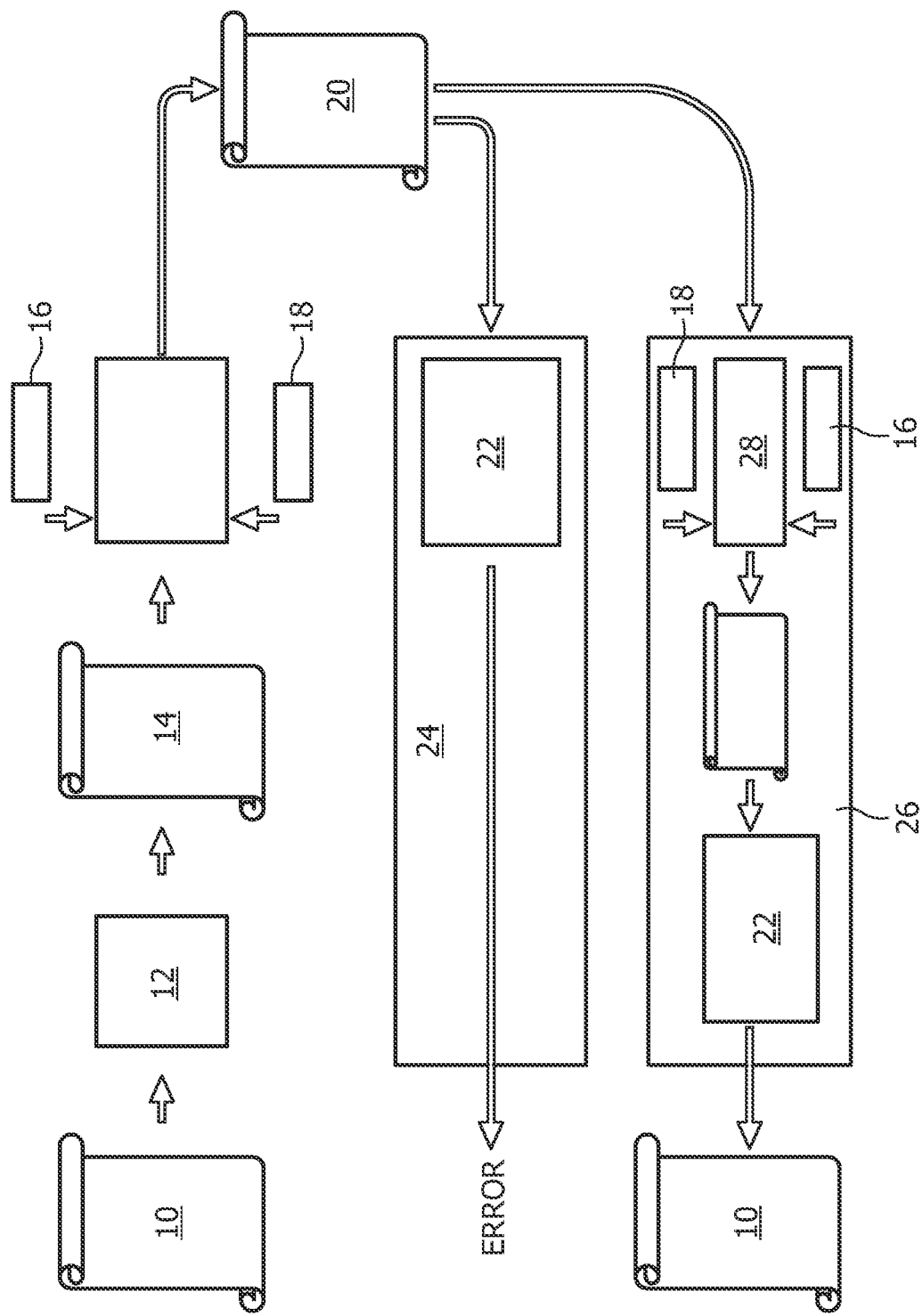
FIG. 1 is a schematic block diagram illustrating a method according to a first exemplary embodiment of the present invention.

Referring to FIG. 1 of the drawings, in a first exemplary embodiment of the present invention, the trace message file 10 (in the form of a PCM array or YUV signal) is input into a conventional media encoder 12 to generate a compressed trace message 14. Then, a trigger string 16 is inserted and the compressed message and trigger string are partially encrypted using a specified product key 18, to generate a partially encrypted, compressed trace message with trigger 20, which is not a valid standard media content file. It will be appreciated that the trace message and trigger file can only be partially encrypted, in particular encryption must not cover the media file headers since they contain the trace trigger (for example, in the user data field) that the traced software component will need to read before the rest of the tracing process, i.e. decryption and rendering, will be triggered.

It will also be appreciated that the partially encrypted compressed trace message with trigger is not a valid standard media content file because the compressed content is encrypted. Thus, when the partially encrypted compressed trace message with trigger 20 is input to a standard media decoder 22 of a device 24 that does not include the traced software component, an error will occur and the device may even crash. On the other hand, if the partially encrypted compressed trace message with trigger 20 is input to a device 26 including the traced software component, a trigger detector and descrambler 28 regenerates the compressed trace message 14 using the product key 18 and the trigger string 16 as inputs. The compressed trace message 14 is input to a standard media decoder 22 and the original trace message is output in the supported media format.

In order to prevent a conformant media decoder from crashing in response to receiving encrypted compressed content, selective encryption is preferably used to scramble only parts of the bitstream that do not contain control bits, i.e. those parts which do not change the way in which the decoder processes the data but only the final parts of the decompression. However, the embodiment described with reference to FIG. 1, whilst effective, may be unnecessarily complex.

As in the above exemplary embodiment, in conventional systems, media encryption is usually performed after compression because, if raw media is encrypted (or scrambled) the statistical properties of the raw media (on which the compression technologies rely) would be completely changed and the compression performances may thus be severely degraded. However, in the case of the present invention, only the specific trigger file will suffer from this problem and, because the trigger file is included in the media content file, rather than the software component, the size of this file is immaterial.

Figure 2:
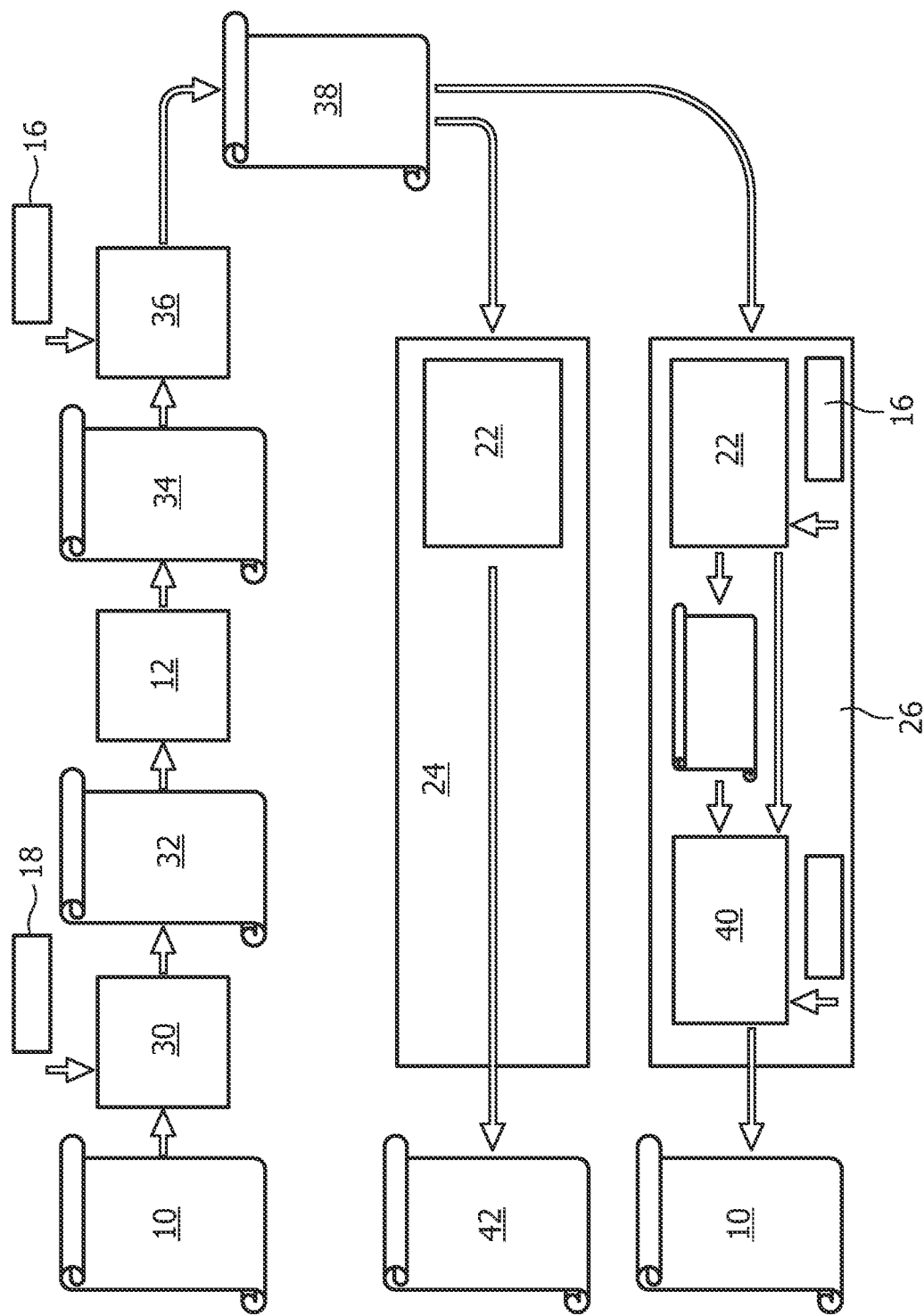
FIG. 2 is a schematic block diagram illustrating a method according to a second exemplary embodiment of the present invention.

Thus, referring to FIG. 2 of the drawings, in a second exemplary embodiment of the present invention, the trace message 10 in the required media format is input to a content scrambler 30 which uses a product key 18, specific to the traced software component, to generate a scrambled trace message 32. The scrambled trace message 32 is input to a standard media encoder 12 and the resultant compressed scrambled trace message 34 is fed to a trigger insertion tool 36 which causes a trigger string 16 to be inserted, to generate a compressed trace message with trigger file 38, which is a standard valid file. This file 38 is incorporated in the content field of a media content file to be input into the standard media decoder 22 of a target device. If the tested device 24 does not contain the traced software component, the media content may be correctly played back, or not, but the trace message 42 will be scrambled. On the other hand, if the tested device 26 does contain the traced software component, the scrambled trace message 32 is regenerated by the standard media decoder 22 using the trigger string 16, and a content descrambler 40 is caused to descramble the scrambled trace message 32 using the product key 18, in response to the detected trigger 33, so as to output the trace message 10.

It will be seen from the above, that the embodiment wherein encryption is performed before compression (FIG. 2), rather than afterwards (FIG. 1), results in a more simplified implementation.

In the above, it is envisaged that the entire frame or array containing the trace message is encrypted. However, it is possible to perform a partial encryption in respect of only the part of the media content (e.g. in the case of video content, only a portion of the screen) containing essential information (e.g. the version number).

One principal consideration in respect of the present invention is that, ideally, there should be a specific media content file designed to test each version of a software component. Thus, if one does not know which version of a software component could be inside a device to be tested, it may be necessary to perform several tests using several different media content files, on a trial-and-error basis, in order to find a possible match.

In order to solve this problem, instead of incorporating the trace message itself in the content field of the incoming media content file, a font file included instead. A font file does not contain the letters or sounds of the trace message themselves, but a collection of instructions that the traced software component can interpret to actually generate the trace message. Thus, a "font" can be defined herein as a collection of patterns (graphical in the case of video and sound in the case of audio) where each pattern corresponds to a text fragment (i.e. a character, word or sentence).

The input media format off the trace trigger file will comprise, as before, a user data field containing the trigger signal which will cause a traced software component to commence the tracing process, but will be ignored by other software components, which will try and process the content file as a normal media content file. As before, the media format may be fully or partially encrypted, which is useful if it is desirable that a product not containing the traced software will not be able to process the incoming media content file at all. The trace trigger media content file contains the trace message minimal font, which forms the basis for generation of the correct trace message according to the version number of the traced software.

Figure 3:
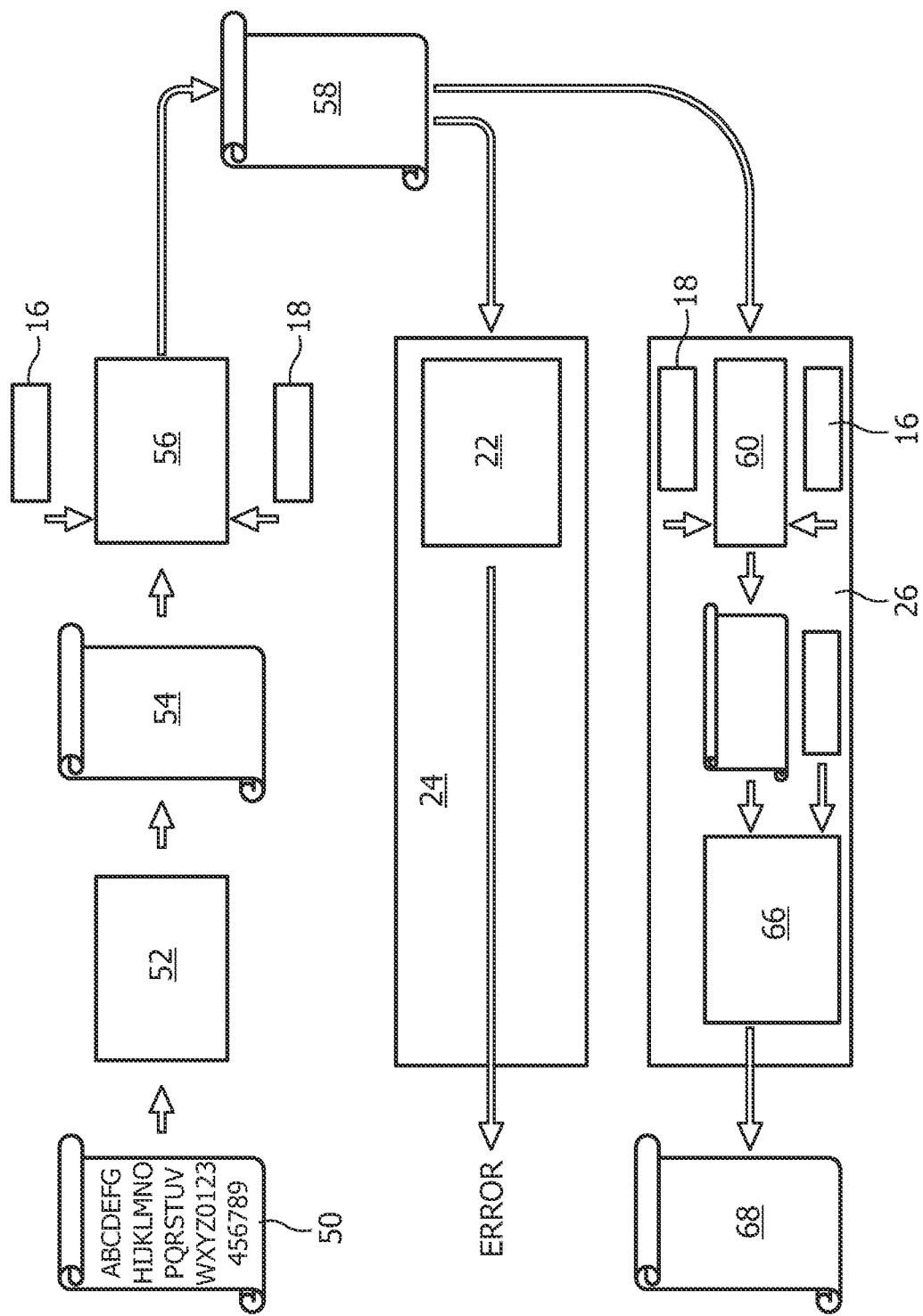
FIG. 3 is a schematic diagram illustrating a method according to a third exemplary embodiment of the present invention.

Referring to FIG. 3 of the drawings, in an exemplary embodiment of the invention, a font file 50 in the required media content format is input into a media encoder 52 to generate a compressed font message 54. The compressed font message 54 is input to a trigger insertion and message encryption tool 56, which uses a trigger string 16 and product key 18 (specific to the traced software component) as inputs to generate a compressed font message with trigger 58. This is not a valid standard content file. Thus, if it is input to the standard media decoder of a device 24 not having the traced software component, an error will occur. On the other hand, if the file 58 is input to a device 24 incorporating the traced software component, a trigger detector 60 detects the trigger string in the user data field and uses the trigger string 16 and product key 18 as inputs to regenerate the compressed font message 62. The compressed font message 62 and data representative of the version number 64 of the traced software are then used as inputs to a character generator 66 (or "trace message generator") for generating a trace message in the desired file format.

In the case of video, the font file may consist of YUV rectangular areas, each containing the image of a piece of text (letter, word or sentence fragment). These rectangular areas are ordered in a predefined manner so that the tracing software embedded in the traced software component can easily retrieve them and map each to the corresponding piece of text, which is especially useful for characters (this is the purpose of the font: how to map symbolic character "x" with a way to render in the media the letter "X"). Then, the tracing software will use this font to generate the trace message.

One possible way of implementing this is that this scheme is used only to encode the version number. For example: the input content contains 12 font elements as follows (this is just an example):

i) one font component is an image that displays "this is version"

ii) one font component is an image that displays "of company X video decoder"

iii) the ten remaining font components are for digits from 0 to 9.

The Trace Message is then assembled by using i), then a combination of the elements of iii) corresponding to the version number of the tested software, then using ii).

In case of audio, the font consists of pieces of sentences (but nothing smaller than syllables: this is because the "sound" of letters is not useful to make sentences, a classical text-to-speech problem, each font item contains the PCM samples of such a sentence fragment. These PCM arrays are placed in the media container in a predefined manner so that the Tracing Software embedded in the Traced Software can easily retrieve them and map each to a given character sequence. Then, the Tracing Software will use this font to generate the Trace Message.

Typically one possible scheme is to encode in a single fragment whole pieces of the message that do not change such as "this is version". On the contrary, the Version Number can be constructed by using encodings of each number "One", "Two", "Three", etc.

The key advantage of this method is that the memory footprint of the Tracing Software can be drastically reduced since it does not contain the media material required for output, but instead it "finds" it inside the input media file that also contains the Trace Trigger.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A non-transitory computer-readable medium comprising computer-executable instructions which, when executed by a processing device, cause the processing device to perform a method for decoding received media content, for playback in a predetermined media format, the method comprising:
   receiving a media content file at a media playback decoder, the media content file having a data format comprising a user data field and a content field and including representative data of a trace message in the content field; and
   rendering in the predetermined media format the trace message from the representative data included in the received media content file,
      including identifying the media playback decoder as a traced media playback decoder as the trace message is correctly rendered in the predetermined media format during playback of the media content file,
   wherein the representative data of the trace message comprises a font file included in the content field of the media content,
   wherein the font file comprises a collection of sound patterns, and where each sound pattern corresponds to a text fragment,
   wherein the method further comprises generating the trace message using the font file.

2. The non-transitory computer-readable medium of claim 1, wherein the representative data of the trace message comprises a representation in the predetermined media format of the trace message.

3. The non-transitory computer-readable medium of claim 2,
   wherein the representation comprises the trace message,
   wherein the trace message is partially or fully encrypted by a predetermined encryption mechanism,
   the decoder further performing the steps of:
      decrypting and rendering in the predetermined media format the encrypted trace message included in the received media content.

4. The non-transitory computer-readable medium of claim 3, wherein the trace message is encrypted using a product key unique to the traced media playback decoder.

5. The non-transitory computer-readable medium of claim 2, wherein the media content file is compressed, either before or after encryption of the representative data of the trace message.

6. The non-transitory computer-readable medium of claim 1, wherein a trigger signal is included in the user data field of the content file, for causing the decoder to render in the predetermined media format the trace message from the representative data included in the received media content.

7. The non-transitory computer-readable medium of claim 6, wherein the trigger signal comprises a trigger string inserted in the user data field of the media content file.

8. A method for decoding received media content for playback in a predetermined media format, the method comprising:
   receiving a media content file at a media playback decoder of a media playback device, the media content having a data format comprising a user data field and a content field and including representative data of a trace message in the content field; and
   rendering, at the media playback device, in the predetermined media format a trace message from the representative data included in the received media content file,
      including identifying the media playback decoder as a traced media playback decoder as the trace message is correctly rendered in the predetermined media format during playback of the media content file,
   wherein at least one of the receiving the media content file and the rendering is executed by a computer,
   wherein the representative data of the trace message comprises a font file included in the content field of the media content,
   wherein the font file comprises a collection of sound patterns, and where each sound pattern corresponds to a text fragment,
   wherein the method further comprises generating the trace message using the font file.

9. The method according to claim 8, the media content file having a data format comprising a user data field and a content field;
   wherein data representative of a trace message is included in the content field.

10. The method according to claim 9 further comprising causing the decoder to render in the predetermined media format the trace message from the representative data included in the received media content.

11. The method of claim 8, wherein the trace message is partially or fully encrypted by a predetermined encryption mechanism, the method further comprising:
   decrypting and rendering in the predetermined media format the encrypted trace message included in the received media content.

12. The method of claim 8, wherein the trace message is encrypted using a product key unique to the traced media playback decoder.

13. The method of claim 8, wherein a trigger signal is included in the user data field of the content file, for causing the rendering in the predetermined media format the trace message from the representative data included in the received media content.

14. A media playback device stored in a non-transitory computer-readable medium implemented by a computer comprising:
   a decoder for decoding received media content for playback in a predetermined media format, the media content having a data format comprising a user data field and a content field, wherein representative data of a trace message is included in the content field of the media content file, the decoder configured to render in the predetermined media format the trace message represented by the data included in the received media content file, the decoder further configured to identify the decoder as a traced media playback decoder;

wherein the decoder is identified as a traced media playback decoder only if as the trace message is correctly rendered in the predetermined media format during playback of the media content file, wherein the representative data of the trace message comprises a font file included in the content field of the media content, wherein the font file comprises a collection of sound patterns, and where each sound pattern corresponds to a text fragment, wherein the decoder is further configured to generate the trace message using the font file.

15. The media playback device of claim 14, wherein the trace message is partially or fully encrypted by a predetermined encryption mechanism, the decoder further performing the steps of:

decrypting and rendering in the predetermined media format the encrypted trace message included in the received media content.

16. The media playback device of claim 15, wherein the trace message is encrypted using a product key unique to the traced media playback decoder.

17. The media playback device of claim 14, wherein a trigger signal is included in the user data field of the content file, for causing the decoder to render in the predetermined media format the trace message from the representative data included in the received media content.

* * * * *